US012640552B2

(12) United States Patent
Stokman

(10) Patent No.: US 12,640,552 B2
(45) Date of Patent: May 26, 2026

(54) RESIDUAL CURRENT DEVICE WITH CONTROLLED DISCHARGE

(71) Applicant: DC Systems B.V., Aalsmeer (NL)

(72) Inventor: Henricus David Stokman, Aalsmeer (NL)

(73) Assignee: DC Systems B.V., Aalsmeer (NL)

( * ) Notice: Subject to any disclaimer, the term of this patent is extended or adjusted under 35 U.S.C. 154(b) by 226 days.

(21) Appl. No.: 18/133,033

(22) Filed: Apr. 11, 2023

(65) Prior Publication Data

US 2023/0344214 A1 Oct. 26, 2023

(30) Foreign Application Priority Data

Apr. 21, 2022 (EP) ..................................... 22169343

(51) Int. Cl.
*H02H 3/00* (2006.01)
*H02H 3/08* (2006.01)
*H02J 7/90* (2026.01)

(52) U.S. Cl.
CPC ..... *H02H 3/08* (2013.01); *H02J 7/90* (2026.01)

(58) Field of Classification Search
CPC ..................................... H02H 3/08; H02J 7/007
(Continued)

(56) References Cited

U.S. PATENT DOCUMENTS 3,736,495 A * 5/1973 Calkin .................. H02M 3/156
327/535
4,633,094 A * 12/1986 Knudsen .......... H03K 17/08146
323/287
(Continued)

FOREIGN PATENT DOCUMENTS

CN 107370119 A 11/2017

OTHER PUBLICATIONS

Negari, Shahram et al., "A new Solid-state HVDC Circuit Breaker Topology for Offshore Wind Farms", 2014 IEEE 5th International Symposium on Power Electronics for Distributed Generation Systems, Jun. 24, 2014, 5 pages.

(Continued)

*Primary Examiner* — Crystal L Hammond
*Assistant Examiner* — Lucy M Thomas
(74) *Attorney, Agent, or Firm* — FIG. 1 Patents

(57) ABSTRACT

A direct current residual current protection device having a controlled current discharge having a positive and a negative input terminal, a positive and a negative output terminal, a first switch, a controller and a discharge control circuit. The first switch is interposed between the positive input terminal and the positive output terminal and operatively opens/closes an electrical connection between the positive input terminal and the positive output terminal. The controller has a current imbalance detection for a detection of a current imbalance between the positive and the negative output terminal. When the current imbalance is detected, the controller opens the first switch. The discharge control circuit is connected on one end between the first switch and the output terminal and on second end to both negative input and negative output terminal. The discharge circuit has a source of electrical energy that accumulates energy when the first switch is closed and discharges the accumulated energy when the first switch is opened.

6 Claims, 4 Drawing Sheets

(58) Field of Classification Search
　　　USPC .......................................................... 361/87
　　　See application file for complete search history.

(56)　　　　　　　　References Cited

U.S. PATENT DOCUMENTS

| | | | |
|---|---|---|---|
| 5,896,284 A * | 4/1999 | Murasato ................ | H02M 1/34 |
| | | | 363/124 |
| 2003/0080719 A1* | 5/2003 | Watanabe ............... | H02J 7/345 |
| | | | 323/288 |
| 2006/0187594 A1* | 8/2006 | DiSalvo ................. | H02H 3/332 |
| | | | 361/42 |
| 2013/0103220 A1* | 4/2013 | Eaves .................... | H02H 7/261 |
| | | | 700/293 |
| 2018/0241202 A1 | 8/2018 | Mokhberdoran et al. | |

OTHER PUBLICATIONS

European Search Report and Search Opinion dated Oct. 11, 2022 for corresponding European Patent Application No. EP22169343.5, 6 pages.

* cited by examiner

70

80

RESIDUAL CURRENT DEVICE WITH CONTROLLED DISCHARGE

The present disclosure generally relates to a direct current residual current protection device belonging to the field of an electrical protection equipment.

BACKGROUND OF THE DISCLOSURE

This section provides background information related to the present disclosure which is not necessarily prior art.

Direct current, DC, electrical grids are gaining more prominence due to a number of advantages that a DC operated electrical grid may have over an alternating current, AC, operated electrical grid. DC electrical grids are particularly well-suited for an integration with renewable energy sources, storage devices, and electrical vehicles.

One challenge in an widespread implementation of DC electrical grids and systems relates to providing a protection against a DC residual current caused by an unwanted current leakage from an electrical system. Residual current devices, RCD, are designed to disconnect the electrical system upon a detection of a current imbalance between the supply and return currents of the electrical system. Such current imbalance is caused by a leakage current that may be caused by a human body that directly contacts a conductor flowing current which can cause an electric shock accident and may be a serious threat to a human life.

Based on latest research it has been established that an overall charge delivered to a human body and not the current is the most representative of a ventricular fibrillation which is the most common cause of death due to an electric shock.

Therefore, it would be advantageous to have a residual current protective device that limits the charge delivered to a human body caused by the leakage current.

SUMMARY OF THE DISCLOSURE

One aspect of the present disclosure is directed to a direct current, DC, residual current protection device having a controlled current discharge. The direct current residual current protection device having a controlled current discharge comprises a positive and a negative input terminal for connection to a DC power line, a positive and a negative output terminal for connection to a load, a first switch, a controller and a discharge control circuit. The first switch is interposed between the positive input terminal and the positive output terminal, the first switch is configured to open/close an electrical connection between the positive input terminal and the positive output terminal. The controller comprises a current imbalance detection adapted to detect a current imbalance between the positive and the negative output terminal. The controller is adapted to open the first switch when the current imbalance is detected. The discharge control circuit has a first end and a second end, the first end is connected between the first switch and the output terminal, the second end is connected to both negative input and negative output terminal. The discharge circuit comprises a source of electrical energy adapted to accumulate energy when the first switch is closed and discharge the accumulated energy when the first switch is opened.

Additionally, the direct current residual current protection device having a controlled current discharge may further comprise a second switch arranged in series with the first switch and connected to the positive output terminal. The second switch may open slower than the first switch. The controller may be adapted to open both the first and the second switch when the current imbalance is detected. The first end of the discharge control circuit may be connected between the first and the second switch.

Additionally, the discharge control circuit may comprise a blocking diode arranged to block a current flow from the positive input through the discharge control circuit.

Additionally, the discharge control circuit may comprise a capacitor arranged in series with the blocking diode and a first resistor connected parallel to the blocking diode. The first resistor may be configured to limit a charging current of the capacitor.

Additionally, the discharge control circuit may comprise a second resistor arranged in series with the capacitor. The second resistor may be configured to limit a discharge current of the capacitor.

Additionally, the discharge control circuit may comprise a thyristor arranged in parallel with the capacitor and the second resistor. The thyristor may be controlled by the controller so as to control the charge/discharge of the capacitor.

Additionally, the discharge control circuit may comprise a first resistor and a capacitor arranged in series and a third switch arranged in parallel to the first resistor. The controller may be adapted to close the third switch when the current imbalance is detected.

Additionally, the first and the third switch may be a semiconductor-based switch and/or the second switch may be an electromechanical switch.

Additionally, the controller may be configured to sense a current flowing between the first and the second switch and disconnect the first and the second switch when the current exceeds a predefined current limit.

Second aspect is directed to a direct current, DC, residual current protection device having a controlled current discharge. The direct current residual current protection device having a controlled current discharge comprises a positive and a negative input terminal for connection to a DC power line, a positive and a negative output terminal for connection to a load, a first switch, a controller and a discharge control circuit. The first switch is interposed between the positive input terminal and the positive output terminal. The first switch is configured to open/close an electrical connection between the positive input terminal and the positive output terminal. The controller comprises a current imbalance detection adapted to detect a current imbalance between the positive and the negative output terminal. The controller is adapted to open the first switch when the current imbalance is detected. The discharge control circuit is connected in parallel to the first switch and the discharge circuit comprises a source of electrical energy adapted to accumulate energy when the first switch is closed and discharge the accumulated energy when the first switch is opened.

Additionally, the direct current residual current protection device having a controlled current discharge may further comprises a second switch arranged in series with the first switch and connected to the positive output terminal. The second switch may open slower than the first switch. The controller may be adapted to open the first and the second switch when the current imbalance is detected.

Additionally, the discharge control circuit may comprise a blocking diode arranged to block a current flow from the source of electrical energy to the positive input.

Additionally, the discharge control circuit may comprise a capacitor arranged in series with the blocking diode and a first resistor connected parallel to the blocking diode. The first resistor may be configured to limit a charging current of the capacitor.

Additionally, the discharge control circuit may comprise a second resistor arranged in series with the capacitor. The second resistor may be configured to limit a discharge current of the capacitor.

Additionally, the discharge control circuit may comprise a thyristor arranged in parallel with the capacitor and the second resistor. The thyristor may be controlled by the controller so as to control the charge/discharge of the capacitor.

A third aspect is directed to a method of controlling discharge of a direct current, DC, residual current protection device. The method comprising: connecting a positive and a negative input terminal of the DC residual current device to a power line and connecting positive and a negative output terminal to a load, connecting the positive input terminal with the positive output terminal via a first switch, accumulating an energy from the power line in a discharge control circuit when the first switch is closed, detecting by a current imbalance detection, ICM, a current imbalance between the positive and the negative output terminal, opening the first switch when the current imbalance is detected and discharging the accumulated energy from the discharge control circuit when the first switch is opened.

Additionally, the method of controlling discharge of a direct current, DC, residual current protection device may further comprise: connecting the positive input terminal with the positive output terminal via a second switch connected in series with the first switch, discharging, upon the detection of the current imbalance, the accumulated energy from the discharge control circuit to the positive output terminal in the time period when the first switch is opened and the second switch is closed, and opening the second switch.

Additionally, the method of controlling discharge of a direct current, DC, residual current protection device may be used in conjunction with, or as a part of, the first and/or the second aspect of the direct current residual current protection device having a controlled current discharge as defined above.

Further areas of applicability will become apparent from the description herein. The description and specific examples in the summary are intended for purposes of illustration only and are not intended to limit the scope of the present disclosure.

BRIEF DESCRIPTION OF THE DRAWINGS

Other features and advantages of the invention appear from the following detailed description of some of its embodiments, given by way of non-limiting example, and with reference to the accompanying drawings, in which.

DETAILED DESCRIPTION

Figure 1:
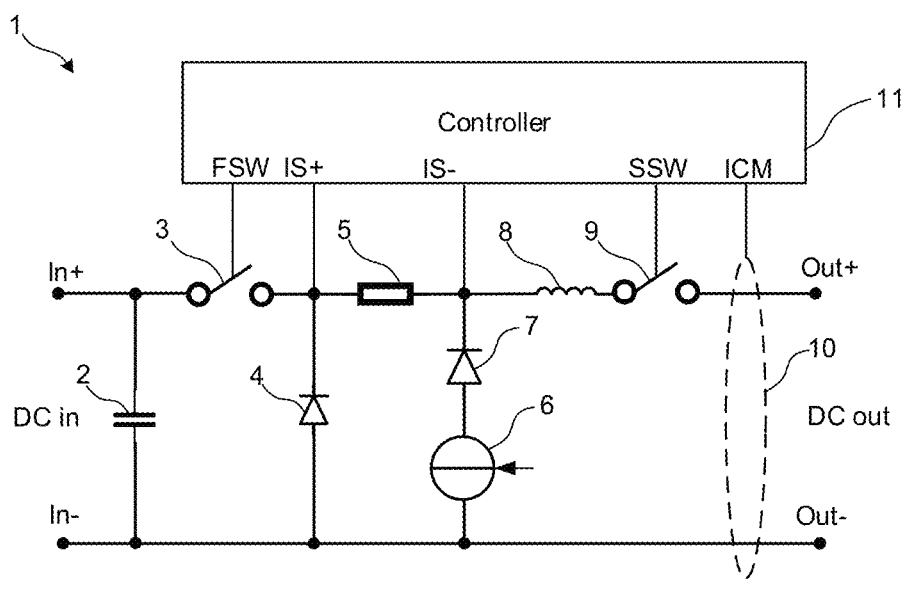
FIG. 1 schematically depicts a first embodiment of the DC residual current protection device having a controlled current discharge.

The foregoing summary, as well as the following detailed description of certain examples will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In the figures, the same references denote identical or similar elements, unless stated otherwise. In the drawings, the size of each element or a specific portion constituting the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

Turning now to FIG. 1, that depicts a first embodiment of a direct current, DC, residual current protection device 1 having a controlled current discharge. The residual current protection device has a positive In+ and a negative In− input terminal for connection to a DC power line DC in and a positive Out+ and a negative Out− output terminal for connection to a load DC out. A first switch 3 is interposed between the positive input terminal In+ and the positive output terminal Out+. The first switch 3 opens/closes an electrical connection between the positive input terminal In+ and the positive output terminal Out+. The residual current protection device 1 further includes a controller 11 having a current imbalance detection ICM, 10 that detects a current imbalance between the positive Out+ and the negative Out− output terminal. Such imbalance may be caused by a leakage current that may be caused by a human body that directly contacts a conductor flowing current which can cause an electric shock accident and may be a serious threat to a human life. A threshold for a level of current imbalance may be pre-set within the controller 11. When the current imbalance is detected by the imbalance detection ICM, 10 the controller 11 may open the first switch 3, that may be closed, effectively disconnecting the positive output terminal Out+ from the positive input terminal In+. The first switch 3 may have an input end connected to the input terminal IN+ and an output end. The controller 11 may operably control opening/closing of the first switch 3 via an output FSW.

When the current imbalance is detected, it is desirable to disconnect the positive output terminal Out+ from the positive input terminal In+ very fast. Hence, the first switch 3 may be a solid-state switch with a fast transient time from a closed to an open state typically in less than a millisecond. Upon opening of the first switch 3 a fast uncontrolled drop of a voltage across the output terminals Out+, Out− may occur. Such uncontrolled fast drop of the voltage across the output terminals Out+, Out− may be harmful to a human body that caused the current imbalance, as it may lead to a fast discharge of the energy acquired by the human body before the first switch 3 was opened.

Therefore, the residual current protection device 1 utilizes a discharge control circuit having a first end connected between the first switch 3 and the positive output terminal Out+ and a second end connected to both the negative input terminal In− and the negative output terminal Out−. The discharge control circuit comprises a source of electrical energy 6 that may accumulate an energy when the first switch 3 is closed and discharges the accumulated energy when the first switch 3 is opened. The discharge control circuit may be formed by the source of electrical energy 6 connected in series with a first diode 7. The first diode 7 may be oriented so as to enable an energy flow from the source of electrical energy 6 towards the positive output terminal Out+, when the first switch 3 is opened. The source of electrical energy 6 may be a current and/or voltage controlled source of electrical energy. The source of electrical energy 6 may comprise a capacitor, a battery or other means of source of electrical energy. One advantage of the discharge control circuit may be to slow down, in a controlled way, the drop in the voltage across the output terminals Out+, Out− when the first switch 3 is opened.

The residual current protection device 1 having a controlled current discharge may further have a freewheel diode 4 as depicted in FIG. 1. The freewheel diode 4 may be connected between the output end of first switch 3 and the negative input terminal In− and the negative output terminal Out−. The freewheel diode 4 may be oriented so as to prevent a reverse voltage/current damage to the first switch 3. Another benefit of the freewheel diode 4 may be to ensure that the output current goes to zero when the first switch 3 is opened.

The residual current protection device 1 having a controlled current discharge may further include a first capacitor 2 connected between the positive and the negative input terminal In+, In−. One advantage of the first capacitor 2 may be a protection of the first switch 3 against overvoltage peaks that may be induced/occur on the DC power line DC in. Another advantage of the first capacitor 2 may be to provide an energy required to open the first switch 3 and/or the second switch 9, so that the DC power line DC connected to the input terminals In+, INdoesn't have to provide such energy.

The residual current protection device 1 having a controlled current discharge may further include a second switch 9 arranged in series with the first switch 3 and connected to the positive output terminal Out+. The controller 11 may operably control opening/closing of the second switch 9 via an output SSW. The discharge control circuit may be connected between the first 3 and the second 9 switch. When the first switch 3 is a solid state switch the second switch 9 may be an electromechanical type of switch with a transient time from a closed to an open state in more than a millisecond, typically more than 5 milliseconds but less than 50 milliseconds. Consequently, when the controller 11 operably opens at the same time both the first 3 and the second 9 switch, then the second switch 9 may open slower than the first switch 3.

The residual current protection device 1 having a controlled current discharge may further have a sensing resistor 5 arranged between first switch 3 and the second switch 9. The sensing resistor 5 may be utilized as a current sensor and the controller 11 may have two voltage inputs IS+, IS− each connected to one end of the sensing resistor 5 so as to sense voltage drop caused by a current flowing through the sensing resistor 5. When the sensed voltage drop exceeds a predefined value the controller 11 may open the first 3 and/or the second 9 switch.

The residual current protection device 1 having a controlled current discharge may further include an inductor 8 connected between the discharge control circuit and the second switch 9. One benefit of the inductor is to slow down current surges or spikes caused by a load connected to a positive Out+ and a negative Out− output terminal.

Figure 2:
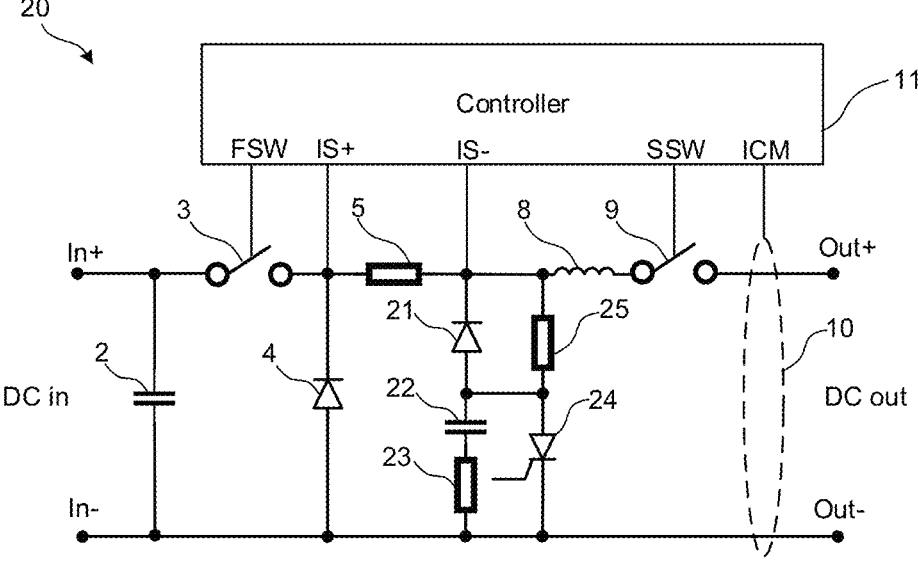
FIG. 2 schematically depicts an exemplary variant of the first embodiment of the DC residual current protection device having a controlled current discharge.

Turning now to FIG. 2, showing a residual current protection device 20 having a controlled current discharge as described above in the first embodiment with a first alternative configuration of the discharge control circuit. The first alternative discharge control circuit has a second capacitor 22 arranged in series with a first blocking diode 21 and a first resistor 25 connected in parallel to the first blocking diode 21. Both the first resistor 25 and the first blocking diode 21 are connected to the first end of the discharge control circuit. A resistance value of the first resistor 25 may be selected to limit a charging current of second capacitor 22 and may control an inrush current flowing through the first switch 3 to the second capacitor 22 upon actuation of the first switch 3 from the open to the closed state. The first alternative discharge control circuit further may have a second resistor 23 arranged in series with the second capacitor 22. The second resistor 23 may be connected to the second end of the discharge control circuit. A resistance value of the second resistor 23 may be set to limit of a discharge current of the second capacitor 22. The resistance value of the second resistor 23 may be calculated based on a voltage rating and a maximum allowable load current of the residual current protection device 20 having a controlled current discharge. The first alternative discharge control circuit may further have a first thyristor 24 arranged in parallel with the second capacitor 22 and the second resistor 23 and connected also to the second end of the discharge control circuit. A cathode of the first thyristor 24 may be connected to the second end of the discharge control circuit. The second resistor 23 is optional so the first thyristor 24 may be arranged in parallel with the second capacitor 22. The first thyristor 24 may be controlled by the controller 11 so as to control the charge/discharge of the capacitor. One benefit of such control is that it may provide a simple and an efficient way to control the charge accumulated in the second capacitor 22 and consequently enable control of a drop rate in the voltage across the output terminals Out+, Out− when the first switch 3 is opened.

Figures 3, 4:
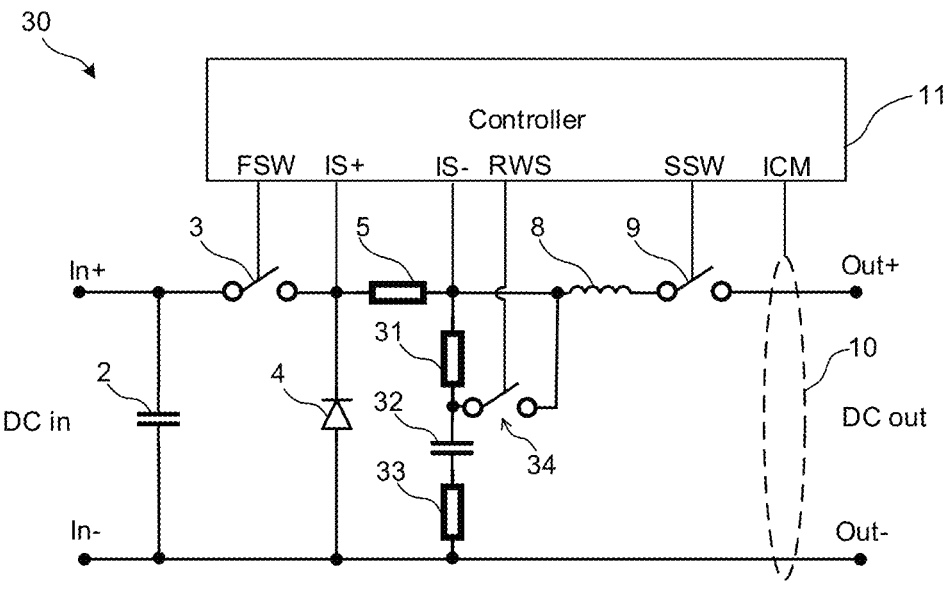
FIG. 3 schematically depicts another exemplary variant of the first embodiment of the DC residual current protection device having a controlled current discharge.
FIG. 4 schematically depicts a second embodiment of a DC residual current protection device having a controlled current discharge.

Turning now to FIG. 3, showing a residual current protection device 30 having a controlled current discharge as described above in the first embodiment with a second alternative configuration of the discharge control circuit. The second alternative discharge control circuit has a third resistor 31 and a third capacitor 32 arranged in series and a third switch 34 arranged in parallel to the third resistor 31. Both third resistor 31 and the third switch 34 may be connected to the first end of the discharge control circuit. The controller 11 may operably control opening/closing of the third switch 9 via an output RWS. The second alternative discharge control circuit may also have a fourth resistor 33 connected to the third capacitor 32 on opposite end than the third resistor 31. The fourth resistor 33 may be connected to the second end of the discharge control circuit. A resistance value of the third resistor 31 may be selected to limit a charging current of the third capacitor 32 so as to control an inrush current flowing through the first switch 3 to the third capacitor 32 upon an actuation of the first switch 3 from the open to the closed state. A resistance value of the fourth resistor 33 may be calculated based on a voltage rating and a maximum allowable load current of the residual current protection device 30 having a controlled current discharge. The controller 11 may be arranged to close the third switch 34 when the current imbalance is detected. When the third switch 34 is closed by the controller 11 it may allow the stored energy of the third capacitor 32 to be discharged to the positive output terminal Out+ and consequently slows down a drop in the voltage across the positive and the negative output terminals Out+, Out− when the first switch 3 is opened.

Turning now to FIG. 4, that depicts a second embodiment of direct current, DC, residual current protection device 40 having a controlled current discharge. The second embodiment differs from the first embodiment only in an arrangement of the discharge control circuit. The rest of circuitry remains the same as in the first embodiment. The second embodiment may be particularly suitable for cases of a low load or no load at all applied on the positive and the negative output terminal Out+, Out−. The first and the second embodiments and their alternatives may be advantageously combined into a one residual current protection device having a controlled current discharge.

As depicted in FIG. 4 in the second embodiment the discharge control circuit is connected parallel to the first switch 3. The discharge control circuit of the second embodiment comprises a source of electrical energy 41 that may accumulate an energy when the first switch 3 is closed and discharges the accumulated energy when the first switch 3 is opened. The discharge control circuit may be formed by the source of electrical energy 41 connected in series with a second diode 42. The second diode 42 may be oriented so as to enable energy flow from the source 41 towards the positive output terminal Out+ when the first switch 3 is opened. The source of electrical energy 41 may be a current and/or voltage controlled source of electrical energy. The source of electrical energy 41 may comprise a capacitor, a battery or other type of a source of electrical energy. One advantage of the discharge control circuit may be to slow down, in a controlled way, the drop in the voltage across the output terminals Out+, Out− when the first switch 3 is opened.

Figures 5, 6:
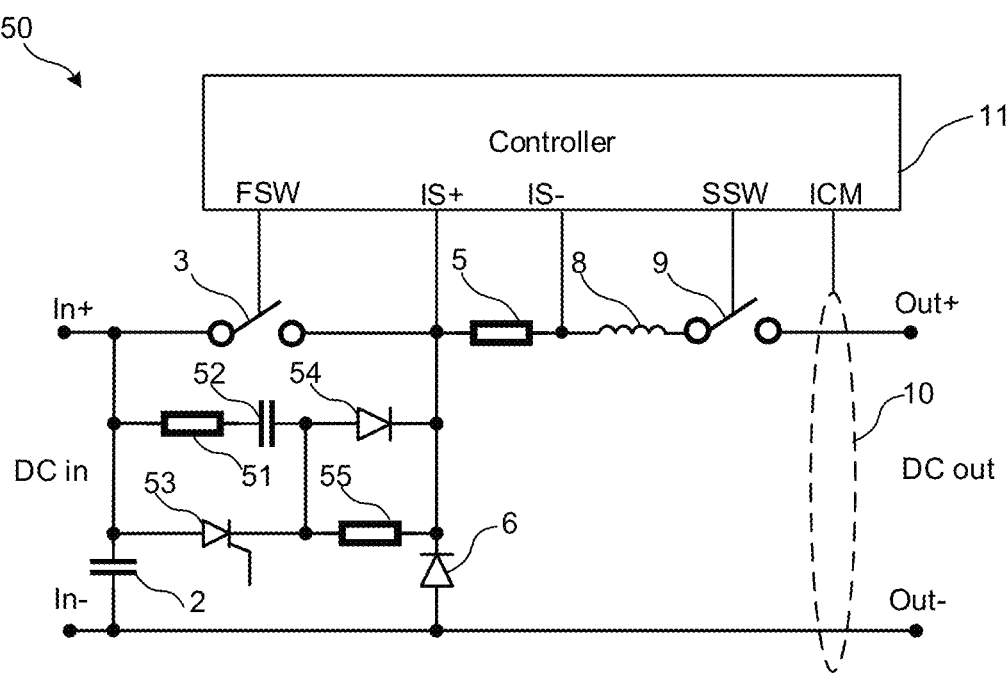
FIG. 5 schematically depicts an exemplary variant of the second embodiment of the DC residual current protection device having a controlled current discharge.
FIG. 6 schematically depicts another exemplary variant of the second embodiment of the DC residual current protection device having a controlled current discharge.

Turning now to FIG. 5, showing a residual current protection device 50 having a controlled current discharge as described above in the second embodiment with a third alternative configuration of the discharge control circuit. The third alternative discharge control circuit 50 having a controlled current discharge has a fourth capacitor 52 arranged in series with a second blocking diode 54 and a fifth resistor 55 connected in parallel to the second blocking diode 54. The second blocking diode 54 may have its anode connected to the fourth capacitor 52. The second blocking diode 54 may be oriented so as to enable energy flow from the fourth capacitor 52 towards the positive output terminal Out+ when the first switch 3 is opened.

A resistance value of the fifth resistor 55 may be selected to limit a charging current of the fourth capacitor 52 and may control a current flow to the fourth capacitor 52 upon an actuation of the first switch 3 from a closed to an open state. The third alternative discharge control circuit may further include a sixth resistor 51 arranged in series with the fourth capacitor 52 and connected to the positive input terminal In+. A resistance value of the sixth resistor 51 may be set to limit the maximum charging current of the fourth capacitor 52. The third alternative discharge control circuit may further have a second thyristor 53 having an anode connected to the positive input In+ and a cathode connected to the fourth capacitor 52, fifth resistor 55 and the anode of the second blocking diode 54. Hence, the second thyristor 53 may be arranged in parallel with the fourth capacitor 52 and the sixth resistor 51. The sixth resistor 23 is optional so the second thyristor 53 may be arranged in parallel with the fourth capacitor 52. The controller 11 may control a gate of the second thyristor 53 so as to control the charge/discharge of the fourth capacitor 52. One benefit of such control is that it provides simple and efficient way to control the charge/discharge of the fourth capacitor's capacity and consequently discharge rate of the voltage across the output terminals Out+, Out− when the first switch 3 is opened.

Turning now to FIG. 6, depicting a residual current protection device 60 having a controlled current discharge as described above in the second embodiment with a fourth alternative configuration of the discharge control circuit. The fourth alternative discharge control circuit has a seventh resistor 63 and a fifth capacitor 62 arranged in series and a fourth switch 64 arranged in parallel to the seventh resistor 63. Optionally the fourth alternative discharge control circuit may also have eight resistor 61 connected to the fifth capacitor 62 on opposite end of the fifth capacitor 62 than where the seventh resistor 63 is connected. The controller 11 may operably controls opening/closing of the fourth switch 64 via an output RWS. The controller 11 may close the fourth switch 64 when a current imbalance is detected between the positive Out+ and the negative Out− output terminal. When the fourth switch 64 is closed by the controller 11 it allows the energy to flow into the fifth capacitor 62 from the output terminals and consequently controls a drop in the voltage across the output terminals Out+, Out− when the first switch 3 is opened.

Figure 7:
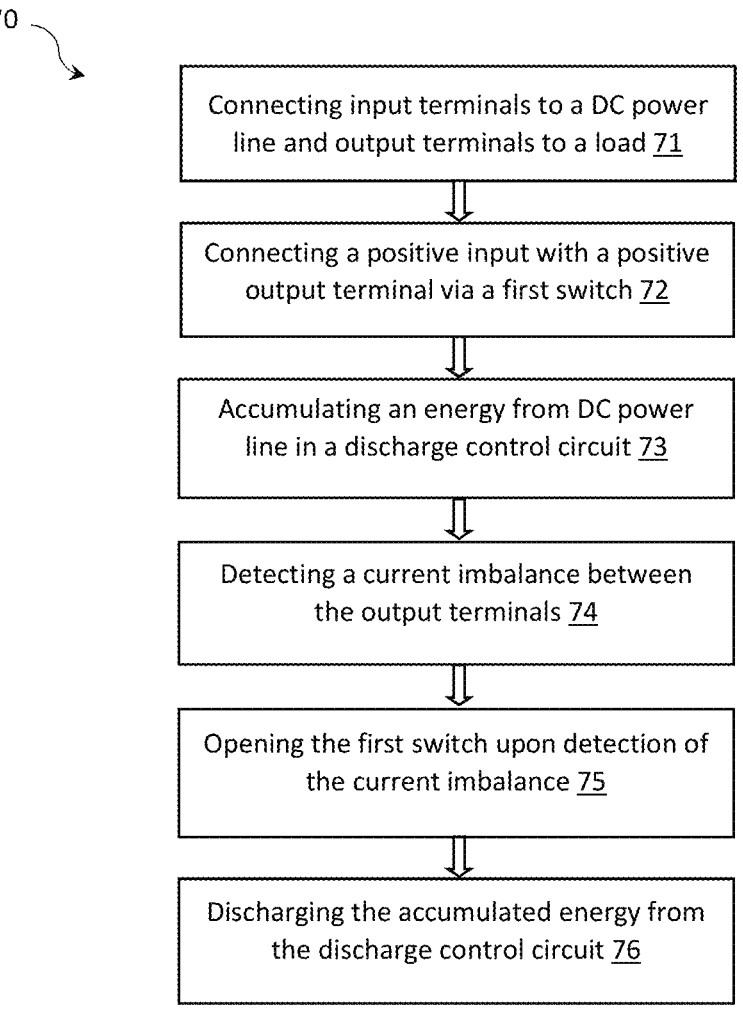
FIG. 7 schematically depicts an exemplary flow diagram of a method of operating the DC residual current protection device having a controlled current discharge.
Figure 8:
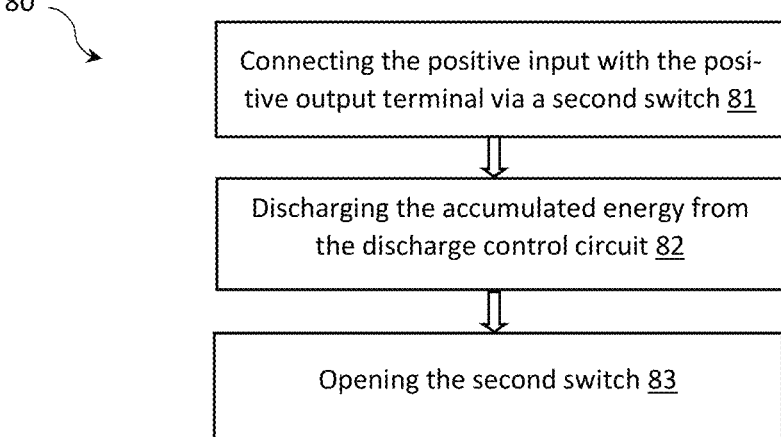
FIG. 8 schematically depicts flow diagram of optional steps for the method of operating the DC residual current protection device having a controlled current discharge.

Moving to FIG. 7, that depicts an exemplary flow diagram of a method 70 of controlling a discharge of a DC residual current protection device as for example described in first and/or second embodiments and shown in FIG. 1 or 4 and further detailed in any of FIGS. 2, 3, 4, 5 and 6. The method 70 may begin at step 71 by connecting a positive In+ and a negative In− input terminal of the DC residual current device to a power line DC in and positive Out+ and a negative Out− output terminal to a load DC out. The method in step 72 connects the positive input terminal In+ with the positive output terminal Out+ via a first switch 3. Then, in step 73, an electrical energy from the power line DC in is accumulated in a discharge control circuit when the first switch 3 is closed. In step 74 the method detects by a current imbalance detection ICM, 10 a current imbalance between the positive Out+ and the negative Out− output terminal and upon detection of such current imbalance the method 70 in step 75 opens the first switch and discharges in step 76 the accumulated energy from the discharge control circuit when the first switch 3 is opened.

The method 70, 80 of controlling discharge of a DC residual current protection device may further comprise step of connecting 81 the positive input terminal In+ with the positive output terminal Out+ via a second switch 9 connected in series with the first switch 3. The method may further comprise step of discharging 82, upon the detection of the current imbalance, the accumulated energy from the discharge control circuit to the positive output terminal in the time period when the first switch 3 is opened, and the second switch 9 is closed and opening 83 the second switch 9.

The method of controlling discharge of a direct current, DC, residual current protection device may be used in conjunction with, or as a part of, the first and/or the second embodiments and their alternatives of the direct current residual current protection device having a controlled current discharge as defined above.

What is claimed is:

1. A device, comprising:

a positive input terminal and a negative input terminal for connection to a direct current (DC) power line and a positive output terminal and a negative output terminal for connection to a load;

a first switch interposed between the positive input terminal and the positive output terminal, the first switch is configured to open/close an electrical connection between the positive input terminal and the positive output terminal;

a controller comprising a current imbalance detection adapted to detect a current imbalance between the positive output terminal and the negative output terminal, wherein the controller is adapted to open the first switch when the current imbalance is detected; and a discharge control circuit having a first end and a second end, the first end is connected between the first switch and the positive output terminal, the second end is connected to both negative input terminal and negative output terminal, wherein the discharge control circuit comprises a source of electrical energy adapted to accumulate energy when the first switch is closed and discharge the accumulated energy when the first switch is opened.

2. The device of claim 1, further comprising: a second switch arranged in series with the first switch and connected to the positive output terminal, the second switch is configured to open slower than the first switch, wherein the controller is adapted to open both the first switch and the second switch when the current imbalance is detected, wherein the first end of the discharge control circuit is connected between the first switch and the second switch.

3. The device of claim 1, wherein the discharge control circuit comprises a blocking diode arranged to block a current flow from the positive input terminal through the discharge control circuit.

4. The device of claim 3, wherein the discharge control circuit comprises a capacitor arranged in series with the blocking diode and a first resistor connected parallel to the blocking diode, wherein the first resistor is configured to limit a charging current of the capacitor.

5. The device of claim 4, wherein the discharge control circuit comprises a second resistor arranged in series with the capacitor, wherein the second resistor is configured to limit a discharge current of the capacitor.

6. The device of claim 5, wherein the discharge control circuit comprises a thyristor arranged in parallel with the capacitor and the second resistor, wherein the thyristor is controlled by the controller so as to control charge and discharge of the capacitor.

* * * * *